United States Patent
Stride

(10) Patent No.: US 6,212,456 B1
(45) Date of Patent: Apr. 3, 2001

(54) PEDESTRIAN IMPACT SENSOR SYSTEM

(75) Inventor: Kevin John Stride, Coventry (GB)

(73) Assignee: Jaguar Cars Limited, Allesley (GB)

( * ) Notice: Subject to any disclaimer, the term of this patent is extended or adjusted under 35 U.S.C. 154(b) by 0 days.

(21) Appl. No.: 09/298,346

(22) Filed: Apr. 23, 1999

(30) Foreign Application Priority Data

Apr. 24, 1998 (GB) .................................... 9808643

(51) Int. Cl.$^7$ .................................... B60R 21/34
(52) U.S. Cl. .................................... 701/45; 180/274
(58) Field of Search .................................... 701/36, 45, 47; 280/728.1, 727, 762; 340/436; 180/274

(56) References Cited

U.S. PATENT DOCUMENTS

| 3,853,199 | * | 12/1974 | Hirashima et al. | 180/274 |
| 5,040,633 | * | 8/1991 | Donag | 180/275 |
| 5,555,512 | * | 9/1996 | Imai et al. | 702/127 |
| 5,794,975 | * | 8/1998 | Nohr et al. | 280/753 |

FOREIGN PATENT DOCUMENTS

| 2454389 | * | 5/1976 | (DE) . |
| 2711338 | * | 9/1978 | (DE) . |
| 2821156 | * | 7/1980 | (DE) . |
| 4320226 | * | 1/1994 | (DE) . |
| 7-108903 | * | 4/1995 | (JP) . |
| 97/18108 | * | 5/1997 | (WO) . |

* cited by examiner

Primary Examiner—Michael J. Zanelli

(57) ABSTRACT

A pedestrian impact sensor system for a motor vehicle comprises sensor (4) for measuring the loads acting simultaneously on different regions across the front of the vehicle to produce pressure patterns (12a and 12b). The system includes a signal processor (14) for monitoring changes in measured pressure patterns over time, and for comparing these changes with data characteristic of pedestrian collisions. If a correspondence is identified, a signal is sent to activate a cushioning device (16).

11 Claims, 2 Drawing Sheets

PEDESTRIAN IMPACT SENSOR SYSTEM

FIELD OF THE INVENTION

The present invention relates to an impact sensor system for use in triggering operation of a deployable device for protecting a pedestrian hit by the front of a vehicle. The invention also relates to an impact sensing method and to a pedestrian protection system which employs the impact sensor system.

BACKGROUND OF THE INVENTION

When a pedestrian is hit by a motor vehicle, for example a car, one type of injury can be caused by a subsequent collision between the pedestrian's head and the hood of the vehicle. Many impact protection systems have been devised to reduce the effects of such collisions, for example hood-mounted airbags or energy-absorbing hood panels. Such deployable systems will be referred to as cushioning devices.

Cushioning devices require a sensor to be used to detect pedestrian impacts, and it is highly desirable for that sensor to discriminate between impact with a pedestrian and other types of impact. The decision of whether to deploy or not to deploy must be made in a very short space of time after detecting an initial impact at the front of the vehicle.

One pedestrian impact sensor system which has been proposed is described in International Patent Application No. WO 97/18108. This system uses a first sensor on the front bumper (fender) and a second sensor on the front edge of the hood of the vehicle. By measuring the time difference between triggering of the first sensor and triggering of the second sensor, and the magnitudes of the signals from those sensors, the system can distinguish between impacts with pedestrians and other sorts of impacts.

It is necessary for there to be an impact between the pedestrian and the vehicle hood before any deployment of a safety device can be triggered.

SUMMARY OF THE INVENTION

According to an aspect of the present invention there is provided a pedestrian impact sensing system for a motor vehicle comprising: a front end assembly mounted on a front end of the vehicle; a cushioning device mounted to the vehicle; memory means for storing pressure pattern data characteristic of pedestrian collisions; sensing means for measuring the loads acting simultaneously on different regions across the front end assembly to produce a pressure pattern; means for monitoring changes in measured pressure patterns over time; means for comparing the changing pressure patterns with stored pressure pattern data; and means for sending a triggering signal for activating the cushioning device when a correspondence is identified between the monitored changing pressure pattern and stored pressure pattern data.

By measuring a changing pressure pattern across the front of the vehicle, it is not necessary to detect collision with the hood of the vehicle.

Preferably the sensing means are located in the front bumper of the vehicle. This permits the use of a single pressure sensitive matrix associated with the bumper. For convenience hereinafter the invention will be described with reference to a pressure sensitive matrix in a front bumper. However, it is to be understood that the invention is not limited to this embodiment.

The pressure pattern, rather than the magnitude of loading of individual matrix cells, principally characterises a pedestrian impact, while the change of pressure pattern with time provides discrimination data relating to magnitude. An advantage of this system is that variation in material properties of the bumper system, for example due to environmental effects or manufacturing variation, may affect the magnitude of load measured by individual cells, but will not significantly affect the pressure pattern.

The comparison means preferably comprises a neural network, which is particularly able to be adaptable to complex cases. However, a conventional algorithm could also be used.

Suitable known matrix technologies may be used for the pressure sensitive matrix, for example force-sensitive resistors, capacitive arrays, strain gauges and piezo-resistive or capacitive load cells.

The pressure sensitive matrix may be sandwiched between a rigid bumper beam and the bumper cover or trim panel. An energy absorbing module, for example a foam module, is preferably held under compression against the matrix. The matrix may be sandwiched between the foam module and the bumper beam, between the foam module and the bumper cover, or within the foam module.

In a particularly preferred embodiment, the bumper is provided with a plurality of discrete loading features, each corresponding to a region of the bumper where an element of the pressure pattern is to be measured. Each loading feature may comprise a projection in the bumper cover, in the foam module, or in the pressure sensitive matrix. The loading features improve load transmission to the sensor elements of the matrix.

Any vehicle systems that use a radiated field (for example radar, infrared, ultrasound, or microwave) to establish conditions outside the vehicle exterior could be used as a low-level trigger to activate a high processing rate in the impact sensor system. For example, if an automatic cruise control system sensed relative movement between the vehicle and an external object, the pedestrian impact sensor could commit system resources to discriminating an impact, given the higher level of event confidence gained. This information could also be used in the deployment decision-making process, similar to an interior airbag controller's "safing" sensor.

A further aspect of the present invention provides a method for detecting pedestrian impact with a motor vehicle, comprising: measuring loads acting simultaneously across the front of the vehicle to produce a pressure pattern; monitoring changes in measured pressure patterns over time; comparing the changing pressure patterns with stored data for changing pressure patterns characteristic of pedestrian collisions to determine if there is a correspondence; and sending a triggering signal to activate a cushioning device if a correspondence is identified.

According to another aspect of the present invention there is provided a pedestrian protection system for a motor vehicle, comprising: a cushioning device for cushioning an impact with a pedestrian, being actuatable by a triggering signal; sensing means for measuring the loads acting simultaneously on different regions across the front of the vehicle to produce a pressure pattern; means for monitoring changes in measured pressure patterns over time; means for comparing the changing pressure patterns with stored data for changing pressure patterns characteristic of pedestrian collisions; and means for sending a triggering signal to the cushioning device when a correspondence is identified between a measured changing pressure pattern and stored data.

BRIEF DESCRIPTION OF THE DRAWINGS

The invention will now be further described, by way of example, with reference to the following drawings in which.

DETAILED DESCRIPTION OF THE PREFERRED EMBODIMENTS

Figure 1:
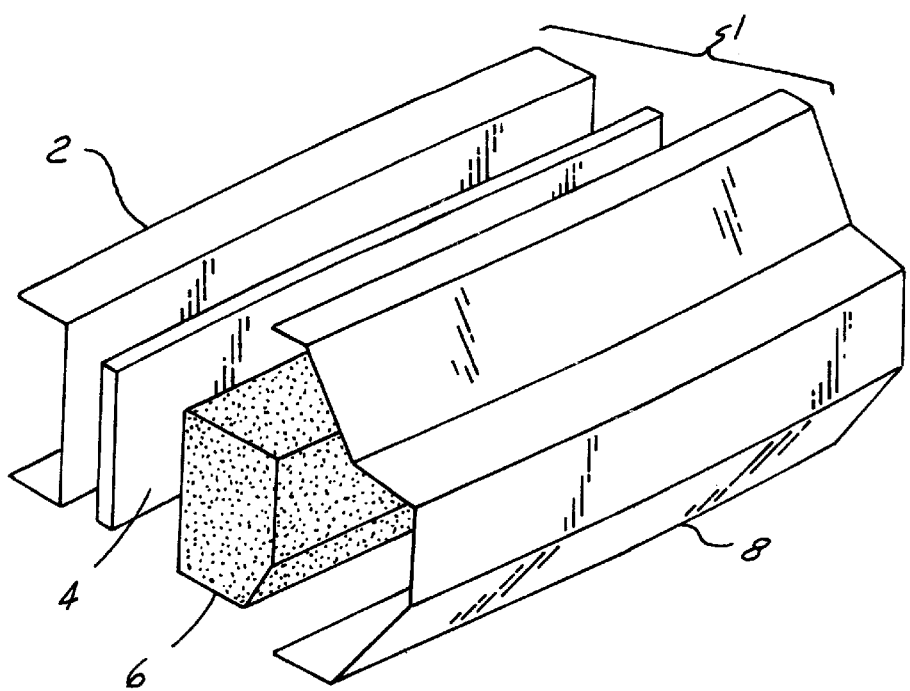
FIG. 1 is an exploded view of a vehicle bumper for use in a pedestrian impact sensor system in accordance with an embodiment of the present invention.
Figure 2:
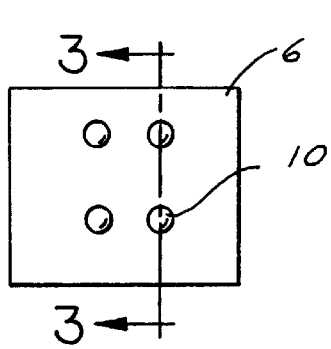
FIG. 2 is a view from the rear of a portion of the foam module of FIG. 1.
Figure 3:
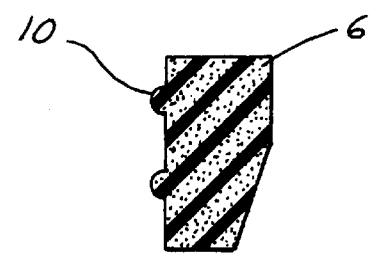
FIG. 3 is a sectional view along the line A—A of FIG. 2.

Referring to FIGS. 1–5a, a vehicle bumper portion 1 of a front end assembly is shown that comprises a rigid beam 2 and a cover 8. Sandwiched between the beam 2 and the cover 8 are a pressure sensitive matrix 4 and a foam module 6. The foam module 6 is held in compression against the pressure sensitive matrix 4 so that the force of an impact of an object against the cover 8 is partially transmitted to the matrix 4.

To facilitate force transmission in predetermined apart loading features 10, comprising molded projections or nubs. Each projection corresponds to a region where a pressure reading will be taken and which will map to a picture element in a pressure pattern.

Figure 4:
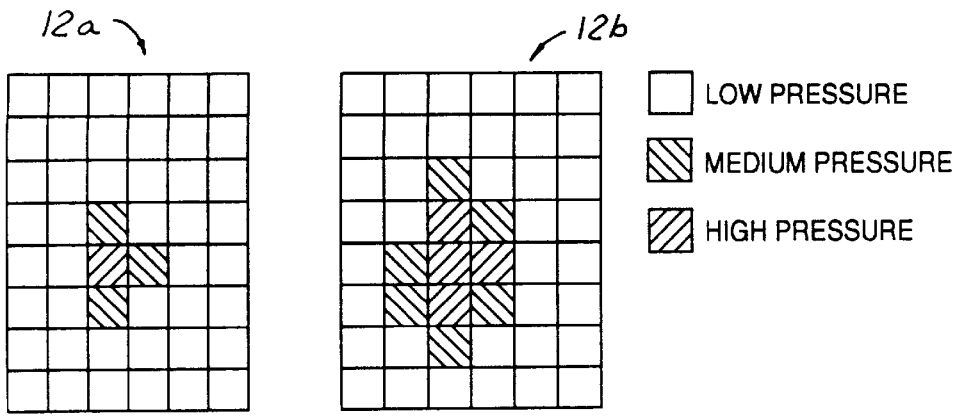
FIG. 4 shows graphically an example of information presented by sensing means to a signal processor in a pedestrian impact sensor system in accordance the first embodiment of the present invention.

Examples of the type of pressure patterns transmitted from the pressure sensitive matrix 4 to the signal processor 14 are shown in FIG. 4. Picture elements from left to right as viewed correspond to sensing regions-across the bumper 1, and picture elements from top to bottom as viewed correspond to sensing regions up and down the bumper 1. The left hand pressure pattern 12a is measured at about five microseconds after an impact, and the right hand pressure pattern 12b is measured at about fifteen microseconds. In this illustration, each picture element can have only three states, namely high, medium, and low pressure. It would of course be possible to make the system more discriminating by measuring finer differences in pressure, or by providing a greater density of sensing regions. This increased discrimination would be at the cost of increasing the necessary processing resources to analyse the greater amount of data in the changing pressure patterns. The allocation of higher processing resources to the pedestrian impact system could be increased in response to a signal from a vehicle system which detects relative movement between the vehicle and an external object.

Figure 5A:
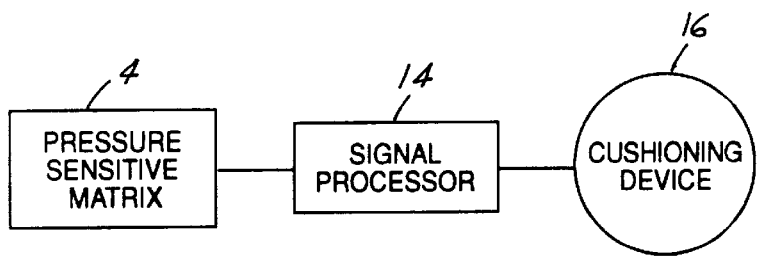
FIG. 5a shows a schematic view of a pedestrian protection system in accordance with the first embodiment of the present invention.

When the pressure patterns 12a and/or 12b are detected, the system shown in FIG. 5a, the pressure sensitive matrix 4 sends pressure information for each loading feature 10 to a signal processor 14, for example a neural network. The signal processor 14 monitors changes in the pressure patterns over time and determines whether a correspondence exists between the changing pressure pattern and stored data for changing pressure patterns characteristic of pedestrian collisions. If a correspondence is identified, the signal processor sends a triggering signal to a cushioning device 16, for example a hood-mounted airbag, so that the cushioning device is deployed.

Figure 5B:
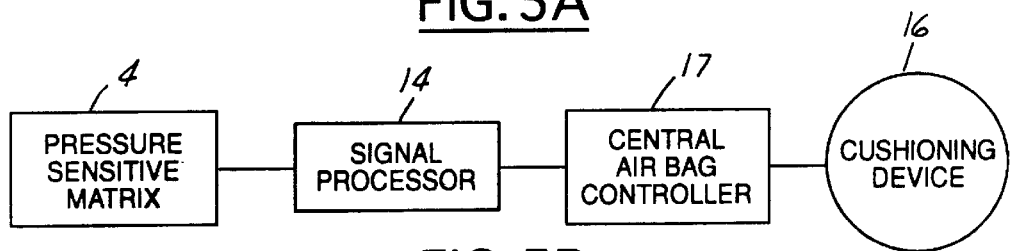
FIG. 5b shows a schematic view similar to FIG. 5a, but illustrating a second embodiment of the present invention.
Figure 5C:
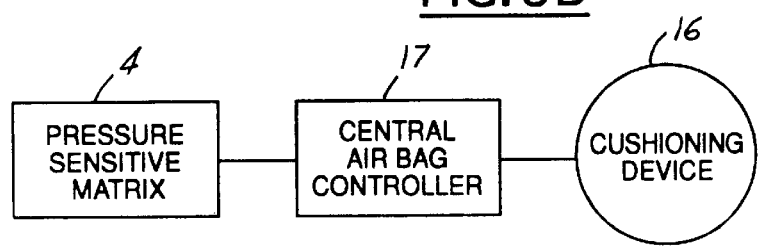
FIG. 5C shows a schematic view similar to FIG. 5a, but illustrating a third embodiment of the present invention.

FIGS. 5b and 5c illustrate alternate embodiments of the present invention. As illustrated in FIG. 5b, the pressure sensitive matrix 4 may provide a decision or data to a central airbag controller 17, which then has the ability to trigger deployment of the airbag 16. Alternatively, as is illustrated in FIG. 5c, the airbag controller 17 may include the processing capability of the signal processor 14 with itself, and determine the deployment of the cushioning device.

The present invention therefore provides pedestrian sensing and cushioning systems which do not require sensing of hood collision and which are tolerant of manufacturing and environmental variations. Thus, while certain embodiments of the present invention have been described in detail, those familiar with the art to which this invention relates will recognise various alternative designs and embodiments for practicing the invention as defined by the following claims.

I claim:

1. A pedestrian impact sensing system for a motor vehicle comprising:

a front end assembly mounted on a front end of the vehicle;

a cushioning device mounted to the vehicle;

memory means for storing pressure pattern data characteristic of pedestrian collisions;

sensing means for measuring the loads acting simultaneously on different regions across the front end assembly to produce a pressure pattern;

means for monitoring changes in measured pressure patterns over time;

means for comparing the changing pressure patterns with stored pressure pattern data; and means for sending a triggering signal for activating the cushioning device when a correspondence is identified between the monitored changing pressure pattern and stored pressure pattern data.

2. A pedestrian impact sensing system as claimed in claim 1, wherein the front end assembly includes a bumper assembly and the sensing means is housed in the bumper assembly.

3. A pedestrian impact sensing system as claimed in claim 2, wherein the bumper assembly includes a rigid bumper beam and a bumper cover, and the sensing means is sandwiched between the rigid bumper beam and the bumper cover.

4. A pedestrian impact sensing system as claimed in claim 3, wherein the bumper assembly further includes an energy absorbing module that is held in compression between the bumper cover and the sensing means.

5. A pedestrian impact sensing system as claimed in claim 4, wherein the bumper assembly is provided with a plurality of discrete loading features, each corresponding to a region of the bumper assembly where an element of the pressure pattern is to be measured.

6. A pedestrian impact sensing system as claimed in claim 5, wherein the loading features comprise nubs or projections on the energy absorbing module.

7. A pedestrian impact sensing system as claimed in claim 1, wherein the sensing means comprises a pressure sensitive matrix.

8. A pedestrian impact sensing system as claimed in claim 1, wherein the means for comparing comprises a neural network.

9. A pedestrian impact sensing system as claimed in claim 1, further including means for detecting relative movement between the vehicle and an external object, means for producing a signal in response to detection of this movement, and means for increasing system resources available to the comparison means in response to the signal.

10. A method for detecting pedestrian impact with a motor vehicle, comprising:

measuring loads acting simultaneously across the front of the vehicle to produce a pressure pattern;

monitoring changes in measured pressure patterns over time;

comparing the changing pressure patterns with stored data for changing pressure patterns characteristic of pedestrian collisions to determine if there is a correspondence; and sending a triggering signal to activate a cushioning device if a correspondence is identified.

11. A pedestrian protection system for a motor vehicle, comprising:

a cushioning device for cushioning an impact with a pedestrian, being actuatable by a triggering signal;

sensing means for measuring the loads acting simultaneously on different regions across the front of the vehicle to produce a pressure pattern;

means for monitoring changes in measured pressure patterns over time;

means for comparing the changing pressure patterns with stored data for changing pressure patterns characteristic of pedestrian collisions; and means for sending a triggering signal to the cushioning device when a correspondence is identified between a measured changing pressure pattern and stored data.

\* \* \* \* \*